United States Patent Office 2,762,724
Patented Sept. 11, 1956

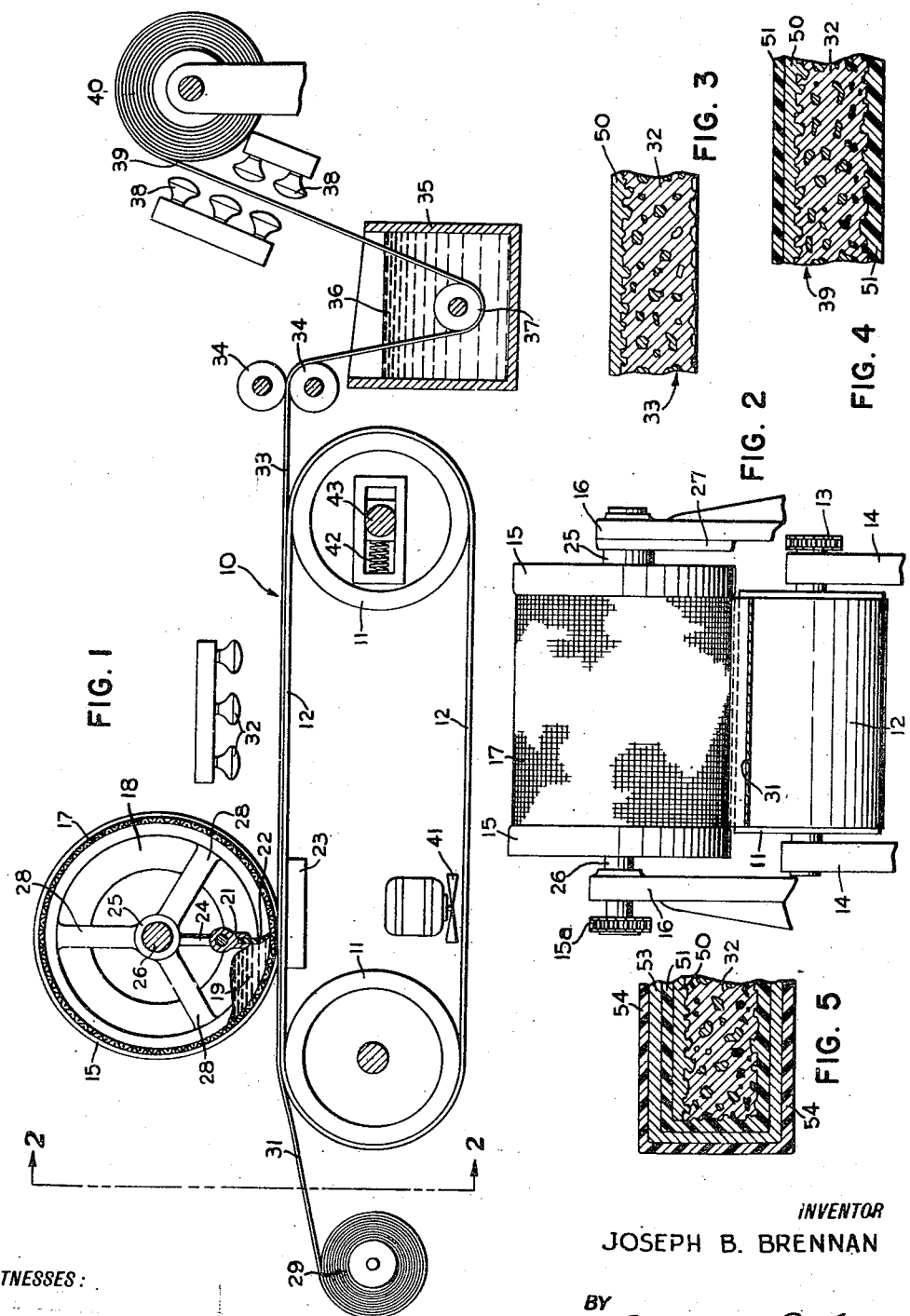

2,762,724

INSULATED POROUS ALUMINUM STRIP

Joseph Bany Brennan, Cleveland, Ohio

Application November 5, 1952, Serial No. 318,909

4 Claims. (Cl. 117—221)

This invention relates broadly to the production of metallic hydroxides and insulation material, and particularly relates to the production of very pure aluminum and magnesium and zirconium hydroxides, and oxides, and to the impregnation and coating of porous metal strips with dielectric material.

A general object of the invention is to provide a novel, effective, easily practiced method for producing a pure aluminum or magnesium or zirconium hydroxide, or oxide.

Another object of the invention is to provide pure metal hydroxides that can be used as insulation materials.

Another object of the invention is to provide a low-cost method of producing aluminum hydroxide in the form of a gel, which gel can be washed free of impurities and then be easily suspended in a carrier liquid for use in covering a base material.

Another object of the invention is to provide an inexpensive but desirable insulator material which can easily be applied to a porous conductive base material for rendering such base material waterproof and for insulating at least one surface of the base.

Another object of the invention is to provide a novel type of an electrode for a condenser wherein the electrode has a base made from a porous metal strip and a dielectric layer covers at least one surface of the metal strip and is intimately bonded thereto.

Another object of the invention is to deposit a hydroxide gel on a conductive base material by suspending such gel in a carrier liquid and placing the liquid on a conductive base material on which and in which the gel is deposited.

Another object of the invention is to make a composite insulated conductor strip which has a surface insulator film intimately bonded thereto.

The foregoing and other objects and advantages of the invention will be made apparent as the specification proceeds.

The present invention relates to a novel method of forming a metallic hydroxide, wherein an electromotive force is applied to a substantially pure metal anode immersed in an electrolyte, with a substantially neutral salt being included in the electrolyte, to aid in the formation of a gelatinous precipitant of metallic hydroxide at the anode. This precipitant can then be filtered or otherwise recovered from the electrolyte and can thereafter be resuspended in pure water to wash the precipitate and remove any impurities present. Next the precipitate may either be dried to form the metal oxide, or it may be deposited in the pores of and on the surface of a porous metal strip to make it suitable for use as an electrode.

In order to form pure aluminum hydroxide, aluminum is subjected to electrolysis in an aqueous solution of a substantially neutral salt. Preferably, the aluminum used is in strip form, and it has a high purity which should be at least 99.8% pure. The aluminum is immersed in a salt solution, which salt preferably is made from an alkali metal and a halogen acid, and the solution by itself has little or no chemical action on the aluminum. Aqueous solutions of sodium chloride give excellent results at low cost. In the electrolysis action, the aluminum is connected to the positive terminal of the source of electrical energy so that the aluminum is the anode, and any conventional cathode is associated with the electrolysis apparatus and connected to a negative terminal to the energy supply source. Usually the cathode is inert in the electrolyte and it may be made from carbon for example. During the flow of electric current, hydrogen gas is evolved at the cathode, whereas aluminum hydroxide is formed at the anode. The aluminum hydroxide is produced as a gelatinous precipitate. It appears that the amount of current and the time of current flow may be varied widely and the desired results can still be obtained. However, it is desirable to use a sufficient current density to produce the aluminum hydroxide at a desired rate. The salt used in the electrolyte solution appears merely to act as a catalyst and it is not consumed or changed in any manner during the process of forming the aluminum hydroxide.

In carrying out the operation of the invention, it has been found that neither the strength of the salt solution nor the voltage applied, nor the time of treatment, need be closely regulated. Excellent results have been achieved by use of solution of sodium chloride of from 1% to 20% by weight when voltages from 1 to 35 volts were used and wherein the electrolyte bath varied in temperature from 4° C. to 38° C. It further appears that the solution strengths, voltages and temperature limits could be carried beyond the limits mentioned above since there is no reason, that I know of, which would prevent satisfactory formation of aluminum hydroxide beyond the ranges indicated above.

Obviously, the solution strengths, voltages and temperatures should be balanced with each other in order to secure uniform results at a desirable rate.

If a weak solution is used, a correspondingly higher voltage should be used in order to produce aluminum hydroxides in equal quantity within any given time. Whereas, if a lower voltage is employed, a greater time is required in order to produce the same quantity of aluminum hydroxide. Particularly desirable results were achieved when a 2% solution of sodium chloride was subjected to a voltage of 45 volts. Carbon cathodes were spaced about an inch from opposite surfaces of a sheet of aluminum and a current of about 6 amperes flowed through the apparatus where the exposed aluminum anode comprises a 3" x 3" piece of aluminum foil.

In order to remove the precipitate, the aluminum hydroxide formed adjacent the anode, it is desirable to change the electrolyte solution relatively frequently, such as about every fifteen minutes. This solution may have a gelatinous aluminum hydroxide precipitate removed therefrom in any conventional manner as by filtering the precipitate from the water. By use of a pure aluminum anode as a starting material, it seems that the only products of the electrolysis are the hydrogen gas given off by the cathode and the aluminum hydroxide, although traces of other materials comprising the impurities in the original aluminum may be carried into the electrolyte. However, none of the substances formed by such impurities by the electrolysis action appear to have any detrimental effect on the desired action, and the aluminum hydroxide precipitate can be freed from such impurities by washing the precipitate with water so as to remove any soluble impurities contained therein.

If the aluminum hydroxide is removed from the electrolysis apparatus by scooping such precipitate out of the electrolyte by some conventional filter scoop, then the reaction of the invention could be carried out continuously until all of the aluminum anode is consumed. In producing the aluminum hydroxide, preferably the original electrolyte solution is substantially neutral and it remains so throughout the electrolytic action. It appears that there is little, if any, chemical action between the aluminum and the electrolyte prior to the application of current thereto. The method of producing the aluminum hydroxide can be carried out with extremely simple and inexpensive apparatus of conventional design.

After the desired pure aluminum hydroxide has been removed from the electrolyte and washed, the aluminum hydroxide can be resuspended by mixing it with pure water and agitating the mixture so as to break up the aluminum hydroxide into small particles.

The purity of the aluminum hydroxide used in coating base materials to form insulators therefrom must be very high so that the covering material is substantially 100% aluminum hydroxide. By use of a starting material which is 99.8% pure and by washing the hydroxide made therefrom, the hydroxide can actually be very close to 100% in purity and is finely divided. Hence, a lengthy wash period of the aluminum hydroxide with pure water greatly aids in reducing the impurities in the aluminum hydroxide to a negligible figure.

While the foregoing process has been described relating to the use of aluminum hydroxide as the material used in forming the solution material, it also is possible to process magnesium and/or zirconium in a similar manner to form magnesium or zirconium hydroxide therefrom which also can be used to form insulation strips in the manner set forth herein.

It will be realized that a portion of the impurities in the starting material may be soluble in the electrolyte or else may precipitate and settle in the electrolyte in either their original form or as altered by the electrolysis action. Such action would increase the purity of the hydroxide recovered.

The aluminum hydroxide produced in accordance with the invention can easily be converted to aluminum oxide, if desired by heating the hydroxide to any suitable temperature between 500 and 1,000 degrees centigrade, while magnesium or zirconium hydroxide can likewise be heated to the same temperature to convert them into the corresponding oxides.

Reference is now made to the accompanying drawings, in which:

Fig. 1 shows, somewhat diagrammatically, apparatus for impregnating a porous metal strip with a hydrogel;

Fig. 2 is a vertical section taken on line 2—2 of Fig. 1; and

Figs. 3, 4 and 5 are fragmentary enlarged sections of electrodes produced in accordance with the invention.

Attention is now directed to the details of the structure shown in the drawing and a coating and impregnating apparatus 10 is provided. The apparatus 10 includes a pair of backing rolls 11 around which an endless belt 12 is looped. The belt 12 usually is made from highly polished stainless steel sheet which is of very uniform thickness to permit the formation of accurately controlled deposits thereon even though the belt itself forms a part of the gauge used to determine the depth of deposit on the belt. One of the backing rolls 11 may carry a sprocket 13 at an end thereof for engagement with any desired driving means for such rolls. The rolls 11 may be journaled in housings 14.

A feature of the apparatus shown is that a suitable cylindrical drum container 15 is provided and is positioned immediately above the top stretch of the belt 12 by means of housings 16 which support the shaft of the drum 15. A portion of the periphery of the drum 15, and usually a continuous portion thereof, is formed from a screen 17, which screen may be formed from metal wires and which may have any desired mesh per square inch, as long as the screen will retain the hydrogel therein but permit passage of same therethrough when a pressure is exerted thereon. Suitable driving means are usually provided to engage with a sprocket 15ª on the shaft of the drum 15 to drive same at the same peripheral speed as the linear speed of the belt 12.

The screen 17 is secured to the drum 15 in any desired manner. The drum 15 usually is provided with open end sections whereby a hydrogel of the types indicated above may be supplied to the interior of the drum and usually is retained in the drum by an edge strip 18 formed on the drum. Hydrogel, indicated at 19 within the drum 15, is deposited onto the belt 12 by means of a doctor blade 21 that is suitably positioned within the drum. The doctor blade 21 is shown as being provided with a flexible edge strip 22 usually formed from rubber. Thus, the edge strip 22 resiliently bears upon the inner surface of the screen 17 and forces the hydrogel 19 through the screen to force the gel towards the backing belt 12. A reinforcing or positioning plate 23 is adjustably positioned immediately below the drum 15 beneath the belt 12 so as to retain the belt 12 in desired accurately spaced position with relation to the outer surface of the drum.

The doctor blade 21 may be positioned within the drum 15 by means of arms 24 secured to a sleeve 25 that is journaled on a shaft 26 which positions the drum 15. The sleeve 25 extends beyond one end of the drum 15, as shown in Fig. 2 and a positioning member 27 is secured to such sleeve and to retain the doctor blade in a desired position within the drum 15. The end of the drum 15 adjacent to the positioning member 27 may be supported on the outer surface of the tube 25 by means of a plurality of radially directed arms 28, the outer ends of which are secured to the drum 15 and the inner ends of which are merely supported by and rotatable with relation to the outer surface of the sleeve 25.

As it is desirable to deposit the hydrogen 19 upon and in the pores of a carrying strip or member, a supply roll 29 is provided which supplies a continuous strip 31 of conventional electrode material. Thus, for example, the strip 31 may be made from porous aluminum.

By use of the apparatus disclosed, an even, continuous layer of hydrogel can be deposited on the strip 31 and pressed into the pores or interstices of the strip from one side thereof, as the strip is firmly pressed against the surface of the screen 17 when the strip passes along under the drum 15 with the belt 12. This deposited film is dried by any conventional means, such as a drying oven, but in this instance a battery of infra-red heaters 32 is shown positioned to direct heat against the strip 31 as soon as it immerges from contact with the drum 15. The heaters 32 are adapted to dry the deposited material completely as such material is moved past the heaters. While the hydrogel, in drying, may shrink in thickness as much as to 1/60th of its original size, the deposited material does not shrink appreciably transversely as it is dried. The dried hydrogel will be intimately bonded to and will saturate pores of the strip 31 to form a strip 33 that can be pulled from the surface of the belt 12 by means of a pair of rolls 34 between which the strip passes after it is removed from contact with the belt 12. Sufficient heaters 32 may be used that they bake the hydrogel and set or bond the dried material to the strip 31.

As another step of the invention, an impregnating tank 35 may be provided and this tank 35 normally contains a solution or a suspension of a resin which is used to impregnate and coat the surfaces of strip 33 and add to the desirable dielectric properties thereof. A volume 36 of a suitable resinous material is shown in the tank 35 and a guide roll 37 may be positioned adjacent the bottom of the tank 35 and have the strip 33 pass thereover to insure satisfactory immersion of the strip 33 in the resinous impregnating material. The resin coated and impregnated strip 33 is next led between a battery of infra-red heaters 38, or other conventional drying means, to dry and set the resin used to coat the strip 33 and produce an insulation-covered, conductive strip 39, after which the continuous strip produced is wound for storage upon a reel 40.

Fig. 1 indicates that a conventional cooling fan 41 or other equivalent device may be associated with the lower reach of the belt 12 so as to cool same prior to deposit of material thereon and prevent premature setting of the hydrogel when the band is in contact with the screen 17. A conventional automatic tension device, indicated at 42, is associated with a shaft 43 by which one of the rolls 11 is positioned so as to maintain the tension of the belt 12 at a desired value.

It will be seen that by positioning the plate 23 in a desired relationship to the outer periphery of the drum 15, and particularly the screen 17 thereof, only a predetermined amount of hydrogel can be forced through the screen 17 for deposit onto the strip 31. The strip 31 must be accurately sized and be of uniform width and thickness to facilitate production of an insulator having uniform size which contributes to the uniformity of its electrical properties. The hydrogel is sufficiently fluid that it will flow in to fill the spaces occupied by the wires forming the screen 17 after the hydrogel has passed out of contact with such screen. The drying of the hydrogel prevents undesired flow of same and suitable siding strips (not shown) may be provided to abut the edges of the strip 31 adjacent the drum 17 and retain the hydrogel on the strip until it reaches the drier 32. It is an important element of the invention that the strip of film produced from the hydrogel by drying same be immediately processed by drying and then impregnating it in the tank 35. This prevents any water absorption by the insulation strip produced from the hydrogel with resultant impairment of the electrical properties of same.

By forcing the strip 31 against the screen 17, the hydrogel can only be deposited in a layer equal in thickness to the screen. The belt 12 preferably is formed from stainless steel and is highly polished to provide a smooth surface thereon to facilitate withdrawal of the dried insulator and electrode strip therefrom. The film produced on the strip 31 can be controlled to about plus or minus .0005 inch in thickness, and usually would be about .001 to .005 inch thick on the surface of the strip 31.

It will be seen that the impregnating tank 35 and associated means may be eliminated if no resin coating is desired on the insulation, or electrode produced. In some instances, the strip 33 might be turned 180° on its longitudinal axis and have a hydrogel layer applied to its untreated surface, if desired.

If desired, refractory fibers or quartz fibers may be mixed with the hydrogel before applying it to a porous conductor. The screen 17 may then be provided with larger openings therein to facilitate passing the fibers therethrough.

Fig. 3 shows an enlarged section of the strip 33. The porous metal strip 32 has a layer 50 of the hydrogel applied thereto on one side thereof and filling the pores of the strip adjacent such side or face of the base metal strip. When the strip 33 is covered with a layer of resin, as shown, the dielectric resin provides a layer 51 over the edges and faces of the strip 33 to produce the dielectric resin-covered strip 39.

The resin preparation 36 may be mixed with the hydrogel 19 to have the materials simultaneously deposited after which the deposit would be baked to set it in engagement with the porous base strip.

Thermosetting resins, such as a silicone or glyptal resin, may be used to form an insulation coating over the surfaces of the coated strips 33. The resin deposited upon the strips 33 may be in any convenient form, such as a solution or suspension, preferably in a material which can readily be dried. The thickness of the layers deposited on the base strip 33 is not critical as long as the complete surface of the strip is covered by the coating materials. The strip 39 may be led into and through a second processing tank 35, or to further hydrogel-depositing means, after which the strip may be led through another conventional drying oven to dry the additional layer of insulation applied to the strip.

In fact, a series of alternate dips of the base strip into an aluminum hydroxide suspension and then passage of the coated strip through drying and resin applying means, and additional drying means may be repeated as many times as is desired so as to build up an insulation material of desired thickness. Fig. 5 shows, in section, an insulation covered conductive strip 52 which is produced from the strip 39 by dipping it into a bath of aluminum hydroxide suspension to provide a layer 53, after which a coat of resin is applied to form a final coating layer 54 thereon. By using alternate coats of pure aluminum hydroxide insulator material and a resinous material, usually thermosetting, the production of a very effective insulator is made possible.

It is desirable to coat a conductive base member with a plurality of coatings of the aluminum hydroxide hydrogel, inasmuch as it is easier to dry a plurality of thin coatings of such material than one thick coating. It is very important that cracks and bubbles be avoided in drying the coated insulation strip and again a plurality of thin coatings function better than fewer thick coatings. Due to the vast amount of water which is in aluminum hydroxide hydrogel, the gel shrinks in thickness in the ratio of from wet to dry, of about 50 to 1.

Furthermore, it is even possible to mix the gel with suitable resins, as pointed out hereinbefore, or to mix the gel with suspensions or solutions of these resins so that the material formed therefrom will comprise an intimate mixture of resin and insulation material obtained from the gel. These mixtures of resin and hydrogel may be spread onto a base strip by a suitable doctor blade.

For illustration purposes, the coatings of resin or oxide on the porous conductive base material are shown as laminations whereas actually the hydroxide, oxide and/or dielectric resin material applied penetrates all the way through the porous base material and blends together so that no real laminations of the material remain.

Heating the hydrogel on the strip 31, for example, changes it to the oxide of the starting hydroxide to provide the desired dielectric material in the pores of and on the strip 31.

Aluminum oxide made by practice of the invention is obtained as fine particles all of which will pass through a 300 mesh per square inch screen. These particles can be briquetted. The particles may be cast in graphite molds and be fused by a high frequency electric field. The mold is placed under vacuum and the oxide is heated to make it fluid to fill the mold and produce articles of great accuracy. Sufficient oxide is provided to fill the voids as the oxide particles are fused together. A very dense fused product is obtained. Such articles will withstand high temperatures and retain their strength under high temperatures. Other refractory oxides may be melted and cast this same way. Apparatus for the casting action is shown and explained in my co-pending application Serial No. 225,949, filed May 12, 1951.

The present application is a continuation-in-part of my co-pending application, Serial No. 21,164, now abandoned.

While several complete embodiments of the invention have been disclosed herein, it will be appreciated that modifications of these particular embodiments of the invention may be resorted to without departing from the scope of the invention as defined by the appended claims.

I claim:

1. A composite conductor and insulator comprising an interstitially porous aluminum strip and a layer of dielectric impregnating material taken from the group consisting of the oxides and hydroxides of aluminum, magnesium and zirconium, said material encompassing said strip and being intimately bonded thereto, and extending into the pores and interstices thereof from the external faces to the center.

2. A composite conductor and insulator comprising an interstitially porous aluminum strip and a layer of dielectric impregnating material consisting of aluminum hydroxide, said material encompassing said strip and being intimately bonded thereto, and extending into the pores and interstices thereof from the external faces to the center.

3. A composite conductor and insulator comprising an interstitially porous aluminum strip and a layer of dielectric impregnating material consisting of pure aluminum oxide, said material encompassing said strip and being intimately bonded thereto, and extending into the pores and interstices thereof from the external faces to the center.

4. A composite conductor and insulator comprising an interstitially porous aluminum strip and a layer of dielectric impregnating material consisting of a mixture of pure aluminum oxide and a dielectric resin capable of securely bonding alumium oxide to aluminum, said material encompassing said strip and being intimately bonded thereto, and extending into the pores and interstices thereof from the external faces to the center.

References Cited in the file of this patent

UNITED STATES PATENTS

| | | |
|---|---|---|
| 1,361,041 | Fry | Dec. 7, 1920 |
| 2,079,516 | Lilienfeld | May 4, 1937 |
| 2,447,386 | Antonoff | Aug. 17, 1948 |
| 2,448,513 | Brennan et al. | Sept. 7, 1948 |
| 2,537,433 | Waring | Jan. 9, 1951 |
| 2,587,430 | Baldwin | Feb. 26, 1952 |
| 2,628,175 | Henderson | Feb. 10, 1953 |
| 2,687,373 | Hering | Aug. 24, 1954 |